US009249019B2

(12) United States Patent
Arakelyan et al.

(10) Patent No.: US 9,249,019 B2
(45) Date of Patent: Feb. 2, 2016

(54) MULTISTAGE METHOD FOR PRODUCING HYDROGEN-CONTAINING GASEOUS FUEL AND THERMAL GAS-GENERATOR SETUP OF ITS IMPLEMENTATION

(71) Applicants: Gamlet Gurgenovich Arakelyan, Stavropol (RU); Artur Gamletovich Arakelyan, Stavropol (RU); Grant Gamletovich Arakelyan, Stavropol (RU)

(72) Inventors: Gamlet Gurgenovich Arakelyan, Stavropol (RU); Artur Gamletovich Arakelyan, Stavropol (RU); Grant Gamletovich Arakelyan, Stavropol (RU)

(73) Assignee: Zakritoe akzionernoe obshestvo Nauchno-proektnoe prozvodstvenno-stroitelnoe obedinenie "GRANDSTROY", Stavropol (RU)

( * ) Notice: Subject to any disclaimer, the term of this patent is extended or adjusted under 35 U.S.C. 154(b) by 477 days.

(21) Appl. No.: 13/709,010

(22) Filed: Dec. 9, 2012

(65) Prior Publication Data

US 2014/0157665 A1    Jun. 12, 2014

(51) Int. Cl.
*C01B 3/36* (2006.01)
*C01B 3/38* (2006.01)
*B01J 19/24* (2006.01)

(52) U.S. Cl.
CPC ............. *C01B 3/384* (2013.01); *B01J 19/2415* (2013.01); *B01J 2219/00094* (2013.01); *B01J 2219/00159* (2013.01); *B01J 2219/00162* (2013.01); *B01J 2219/00164* (2013.01); *C01B 2203/0233* (2013.01); *C01B 2203/0816* (2013.01)

(58) Field of Classification Search
CPC ............... C01B 2203/1604; C01B 2203/0233; H01M 8/04022; B01J 2208/00309; B01J 2208/00504; B01J 2208/00716
See application file for complete search history.

(56) References Cited

U.S. PATENT DOCUMENTS

| 2002/0114747 | A1* | 8/2002 | Marchand et al. | 422/198 |
| 2004/0105794 | A1* | 6/2004 | Maenishi et al. | 422/190 |
| 2004/0146458 | A1* | 7/2004 | Weissman et al. | 423/651 |
| 2005/0089732 | A1* | 4/2005 | Aoyama et al. | 429/20 |
| 2006/0057444 | A1* | 3/2006 | Takagi et al. | 429/20 |
| 2007/0033872 | A1* | 2/2007 | Simpkins et al. | 48/197 R |
| 2007/0137104 | A1* | 6/2007 | Kamijo et al. | 48/127.9 |
| 2007/0196267 | A1* | 8/2007 | Carpenter et al. | 423/648.1 |
| 2009/0119990 | A1* | 5/2009 | Johnson et al. | 48/61 |

FOREIGN PATENT DOCUMENTS

| FR | 2796078 | 1/2001 |
| GB | 2111602 | 7/1933 |
| RU | 81786 U | 3/1996 |
| SU | 939380 | 6/1982 |
| SU | 1144977 | 3/1983 |

* cited by examiner

*Primary Examiner* — Imran Akram

(57) ABSTRACT

The invention relates to a method for producing hydrocarbon-containing gaseous fuel comprises at least three stages. In the first stage water is entered for heating and water steam forming. In the second stage hydrocarbon component is entered and mixed with water steam by injecting The mixture is heated and directed to third and subsequent stages to additional heating for fuel producing. Turbo generator is made as two cylinder tubes, divided on isolated sections. The first section is made with induction heat source for system start-up, the second section is made with injector type mixer. The inner tube cavity forms the firing chamber. In technological cylinder multistage components and mixture heated and additional heating in subsequent sections are realized until forming of hydrogen-containing gaseous fuel. Burning system, worker burner, start-up burner are installed on the firing chamber inlet. Working torch forming element is installed on the firing chamber outlet.

11 Claims, 3 Drawing Sheets

Figure 1:
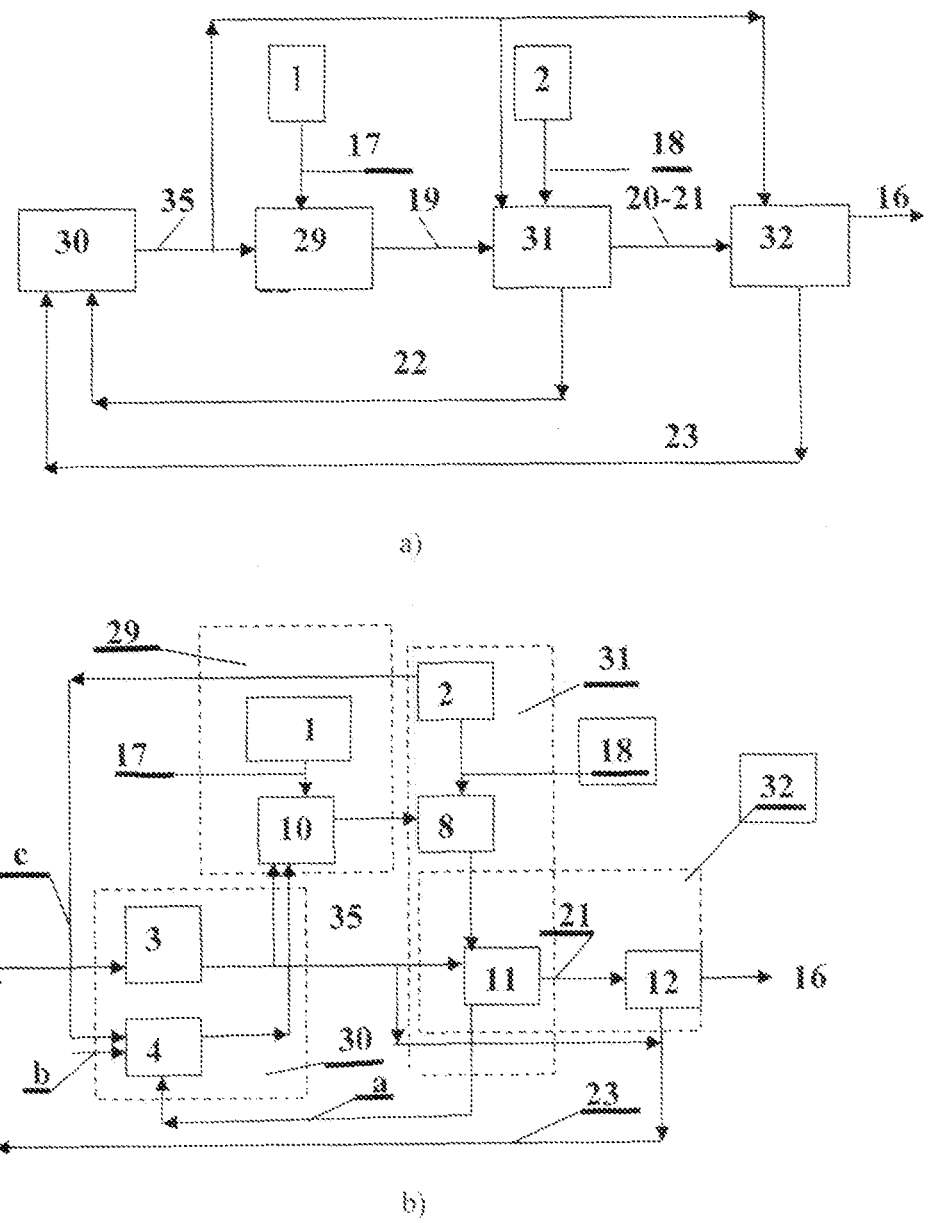

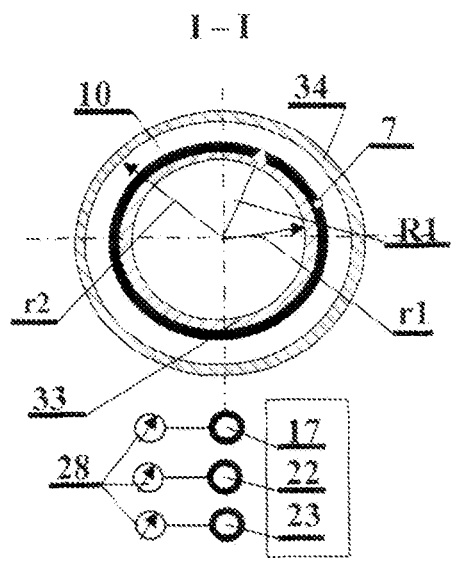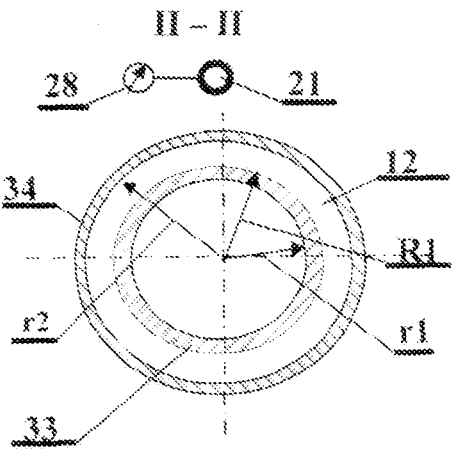
Fig. 3
Fig. 4
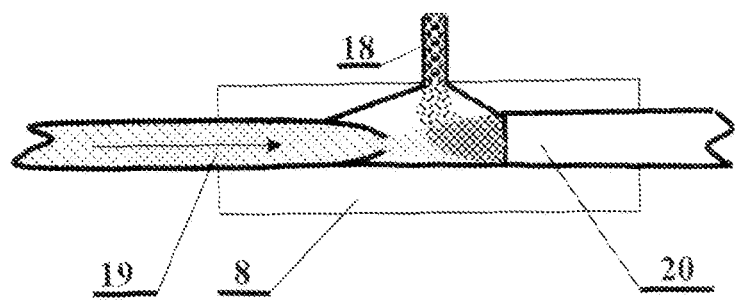
Fig. 5
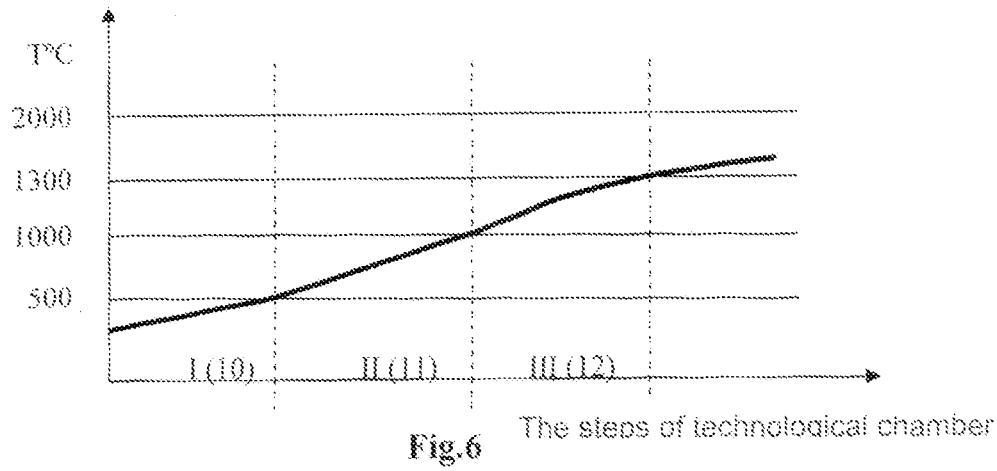
Fig. 6

MULTISTAGE METHOD FOR PRODUCING HYDROGEN-CONTAINING GASEOUS FUEL AND THERMAL GAS-GENERATOR SETUP OF ITS IMPLEMENTATION

This application is the United. States national application which claims the benefit of Russian. Patent application. No RU 2011 152015 Filed: 20 Dec. 2011, the entire disclosure of which is incorporated herein by reference.

1. FIELD OF THE INVENTION

The invention relates to energy-saving technologies, mainly to methods and plants for converting water H2O into hydrogen-containing gas in the environment of catalyst medium from line of $C_nH_{2n+}2$ (diesel fuel, residual oil) during a continuous heat flame medium, when a burning temperature is above 500° C.

Most often such methods are referred to systems, in which gaseous fuel production and implementation by burning are combined into a single cycle, but they may be also used for accumulation of hydrogen-containing gas fuel.

2. BACKGROUND OF THE INVENTION

One method that is known is of generating hydrogen-containing gas (SU Pat No 1144977, 1985), where components are burned in a high temperature mode at.

The disadvantage of the method is the high power consumption.

One method that is known is of a getting gas from hydrocarbon raw material (SU Pat No 939380, 1982), wherein water steam, superheated up to 430 degrees, is mixed with hydrocarbons as well as with a heating steam and gas mixture.

The disadvantage of the method consists in the necessity to apply an additional energy source to produce superheated steam and subsequent heating.

Another known method is an application of water steam in its various phase states, all of which are characterized by different equilibrium states (Soviet encyclopedic dictionary. M.: 1985, p 962, Ref. "Steam").

Another known method is the "Method of producing hydrogen-containing gas in the turbo-generator setups>> (RU Pat. No 2269486, 2006).

This method and device for its implementation have the same purpose as the claimed technical solution while this method is characterized by sequence of operations, has several stages and is combined in a single closed cycle. The device corresponds with these stages.

Also in this method technical solution is realized in multistage method of producing of hydrogen-containing gaseous fuel with closed cycle, including process start-up in the mode of forced warm-up and realization of a self-heating process in the normal mode of self-heating, which includes mixing of the hydrocarbon component and water, their entering by pumping under the pressure, heating, fuel return and ignition.

In the known technical solution the initial mixing in liquid phase of water and hydrocarbon component at normal (20 degrees) temperature of components does not ensure stability of dispersed composition of the mixture, directed in the further on heating to produce fuel.

After cessation of mixing (i.e., from the moment of arriving the mixture to heat), reverse process starts it is the mixture lamination due to different densities of water and hydrocarbon component.

This leads to the heterogeneity of the mixture on the dispersed composition. During the subsequent heating of the mixture it is observed also heterogeneity of the temperature.

This heterogeneity is saved in the final product—the fuel mixture, directed to the torch ignition, causes torch burning instability. This happens due to formation of mixture local centers (on composition), where the mixture has no ability to burn. This causes disruption of ignition and extinction of the torch (which is typical for heavy hydrocarbon components). On the other side, there is formation in the mixture of local centers of rapid burning, which lead to unauthorized flash of flame in the torch, which is typical for light hydrocarbon components.

As for the known device, it includes relevant elements of the method realization, it is also inherent to the claimed technical solution.

Thermal gas generator setup is designed as a single device, which has a complex multi-section corps. This setup includes a burner system, firing chamber, device for mixing the components, ignition pulse device, pipes, and start-up system, which includes start-up burner with a supply of combustible fuel. The device has disadvantages, inherent to the implemented method, including failure occurrence in the process of production of fuel due to the heterogeneity of the mixture.

3. SUMMARY OF THE INVENTION

The technical problem consists of eliminating the disadvantages of the known technical solution, ensuring the stability of of hydrogen-containing gaseous fuel production, decreasing of energy consumption, and hydrocarbon component discharge.

The technical result consists in obtaining a homogeneous phase state of the mixture in the process of fuel production and ensures the stability and constancy of the burning of technological firing torch and the working torch. This result also comprising increased safety of hydrogen-containing fuel, production including, reduction of the hydrocarbon component discharge.

This result is achieved by the following steps:

realizing of fuel production as a multi stages process, with closed cycle. This cycle has several stages. The first stage occurs when water is introduced and heated up to water steam formation. At later stages hydrocarbon component is introduced and mixed with water steam to form water steam and hydrocarbon mixture, entering separately, by pumping under pressure, the hydrocarbon component and water into the heated by firing torch technological cylinder, which is divided on isolated sections, number of which corresponds the number of fuel producing stages, additional heating, the mixture up to a temperature of forming of hydrogen-containing gaseous fuel, separating the fuel flow and directing one of its parts into ignition zone, to ensure firing torch burning and other part—for storing and/or external consuming, realizing start-up of process in the forced heating mode, and carrying out of process in the normal mode of self-heating.

Processes of formation of hydrogen-containing gaseous fuel, in the normal mode of self-heating, is carried out with heating in three stages. In the first stage water is introduced by pumping under the pressure of 0.3-0.5 MPa and it is heated up to the formation of water steam with a temperature of 500-550° C. In the second stage hydrocarbon component is introduced into the mixer by pumping under pressure of 0.3-0.5 MPa, this component is mixed with water steam in the mixer by injection under pressure of 0.06-0.25 MPa, at a ratio of water to hydrocarbon component from 1 0.5:1 to 8:1, and the mixture is heated up to a temperature of 1000-1100° C., at the third stage the mixture is heated up to a temperature of 1300-2000° C.

Ignition, in the normal mode of self-heating, is carried out by the ignition pulse unit with an external source—sparking generator, running with a frequency of 1-2 Hz.

Flow of gaseous fuel, in the normal mode of self-heating, is separated and directed one its part into igniting zone, to form the fire torch, and other part—for storage and I or external consumption.

The process of formation and maintenance of the fire torch is carried out with a turbo charging.

At the process of start-up in a mode of forced heating first perform preliminary pumping of water in an amount of 40-50% of maximum amount of normal working volume under pressure 0.3-0.5 MPa. In the first stage heating is carried out until formation of a water steam at a temperature 450-500° C. Heating is carried out from an independent source of heat, such as, for example, induction heater.

Ignition of the steam and hydrocarbon mixture, or other fuel components, at start-up of the process in a forced heating mode is carried out from an independent source by ignition spark pulse device with an independent sparking source, which operates with a frequency of 40-50 Hz.

A thermal gas plant for hydrogen-containing gaseous fuel production with closed cycle comprising corpus, a burner system, firing chamber, unit for components mixing, pulse ignition unit, pipes and start-up system, including independent induction heat source, start-up burner with a supply of combustible fuel. The plant is equipped with fuel tanks, and made as separate sealed discharge containers for water and a hydrocarbon component, the corpus is made as a two cylindrical tubes, imbedded in one another with a gap, forming technological cylinder, divided on three isolated sections, so the section number correspond to number of stages of the process of making of fuel mixture, said cylinder concludes: the 1-st section with an independent induction source of heat, section corresponds to vaporization stage, 2-nd section of stage of components mixing and heating a steam and gas mixture, 3-d section of the additional heating stage for the fuel mixture producing, the inner tube cavity forms the firing chamber, unit for mixing is made as injector with separate inlets for water as a steam, and hydrocarbon component, with all that outlet of the last section of the technological cylinder is connected via pipe to the inlet of firing chamber, where a burner system is installed with ignition device with spark ignition pulse source, a working burner, start-up burner, while at the firing chamber outlet working torch is installed forming an element, as a restriction device, a discharge water container is connected via pipe to the inlet of a first section of the technological cylinder, an outlet of which is connected via pipe to 1-st inlet of injector, the second inlet of injector is connected via pipe to discharge container of hydrocarbon component, injector outlet is connected via pipe to the technological cylinder second section, connected via pipe to third section of technological cylinder.

A ratio of radii of tubes, forming the technological cylinder for fuel mixture producing is:

$$0.3<(R1/r2)>0.1;$$

Where
R1—is an outer diameter of the inner tube,
r2—is an inner diameter of outer tube.
The turbo charging unit is installed on the inlet of the burner system.

The constant overpressure of 0.3-0.5 MPa is supported in the discharge containers.

3.2. BRIEF. DESCRIPTION. OF THE. DRAWINGS

Figure 2:
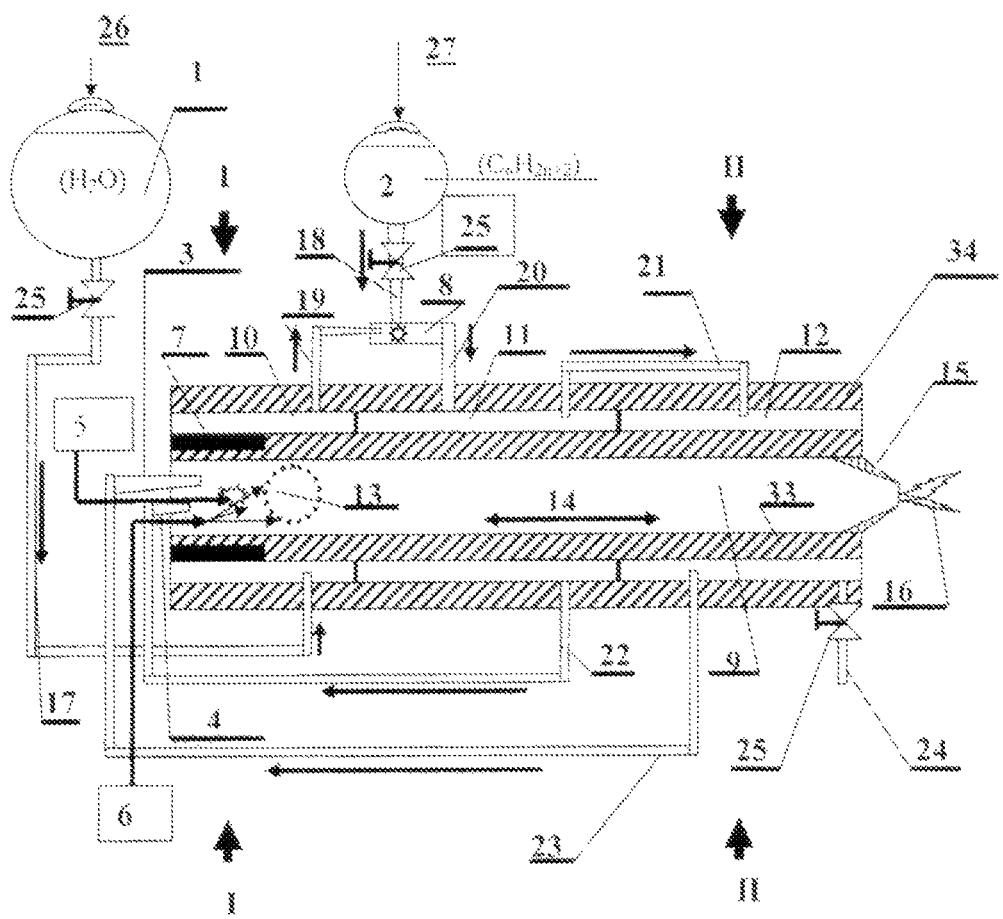

FIG. 1 shows block-diagram of the algorithm, realizing the method:
  a)—generalized block-diagram of the algorithm;
  b)—detailed block-diagram with basic elements;
FIG. 2—shows the scheme of three-section thermal gas-generator setup;
FIG. 3—shows profile I-I in FIG. 2;
FIG. 4—shows profile II-II in FIG. 2;
FIG. 5—shows scheme of injection type mixer;
FIG. 6—shows thermal temperature regime in the technological cylinder, The following designations are used in all drawings:
1—discharge water container; 2—discharge container for hydrocarbon component $S_nH_{2n}+2$; 3—working burner; 4—startup burner; 5—external independent source-generator with pulsed spark igniter; 6—turbocharger unit; 7—induction (pin) heater of turbo generator startup; 8—injection type mixer; 9—fire chamber; 10—first section of the technological cylinder; 11—second section of the technological cylinder; 12—third section of technological cylinder; 13—zone of ignition; inflammation and fire torch formation; 14—zone of technological burning of firing torch (firing torch zone); 15—unit for forming the working torch, 16—working torch zone, 17—technological pipe for water supply by pumping from the discharge water container (1) into the first section (10) of technological cylinder; 18—technological pipe for supply hydrocarbon component $S_nH_{2n}+2$ by pumping from the discharge hydrocarbon container (2) into the injection type mixer (8); 19—technological pipe for steam supply from the first section (10) of technological cylinder into the injection type mixer (8); 20—technological pipe for steam and hydrocarbons mixture supply from the mixer (8) into the second section (11) of technological cylinder; 21—technological pipe for steam and hydrocarbons mixture supply from the second section (11) into the third section (12) of the technological cylinder; 22—technological pipe for steam and hydrocarbons mixture supply from the second section (11) into the start-up burner (4) (return of fuel in the forced heating mode); 23—technological pipe for fuel supply from the third section (12) of technological cylinder into working burner (3) (return of the fuel in the normal mode of self-heating); 24—pipe of fuel take-off for external fuel consumer; 25—control valve; 26—the place of water loading into the discharge container (1); 27—the place of hydrocarbon fuel loading into the discharge container (2); 28—devices for control the head and the pressure in the technological pipes; 29—water steam generation (realizing of process of water steam generation (1, 10) water supply from 1 into 10 for vaporization); 30—fire torch formation; 31—mixing and heating of the water steam and hydrocarbon mixture; 32—heating of the steam and hydrocarbon mixture for fuel producing; 33—inner cylinder of thermal gas generator; 34—outer cylinder of thermal gas generator; a)—supply of steam and hydrocarbon mixture from the second section (11) of the technological cylinder for running process, b)—supply of combustible mixture from an external source for running process, c—supply of hydrocarbon component for running process; 35—technological cylinder heating.

The essence of the proposed method consists in the following:

The method and the setup realizes the dependence of $H_2O+S_nH_{2n+2}=H_2+CO_2$ in high-temperature multi-stage mode.

The thermal ability of carbon is best utilized at water gas.

On the vaporization of water gas of carbon it is requires 8% of its own resources, with all that the water gas consists mainly of CO (40-60%) and H2 (30-50%).

Water gas formation is a complex, at least two-stage process: at 500° C. it is a complete decomposition on hydrogen and carbon dioxide (C+2H2O=2H2+CO2, at 1000-1200° C.—it is a decomposition on hydrogen and carbon monoxide (CO2+C=2CO).

If the water is taken in a steam state, the decomposition of water steam (C+H2O=CO+H2) is accompanied by heat losses, and therefore leads to a cooling. In relation to these, to compensate heat losses, temperature of the first stage of heating must be higher than temperature of final stage—it must be not less than 1300° C.

Presence of the turbo pumping (air, oxygen or other additional oxidant) gives a possibility to obtain so-called generator gas with a temperature of mixture burning of 1935° C., at actual absence on the output environmentally harmful components.

The essence of method is shown in the block-diagram of algorithm its realization (FIG. 1).

The method includes (FIG. 1a) a fire torch forming and providing of technological burning (30) for heating components and mixture in the technological cylinder (35).

To provide the process realization, and a claimed technical problem decision it envisage separation of the technological streams with separate supply (17-18) components—water (1) and the hydrocarbon component (2).

Water is supplied for heating and vaporization (29) for subsequent steam supply (19) for mixing with the hydrocarbon component and subsequent heating of the steam and hydrocarbon mixture (31), which already at this stage may be a flammable mixture.

This mixture is used during start-up of system (22). Then, the mixture is sent to the next stages of processing (32)—for additional warm-up (20-21). The resulting fuel is sent to the system inlet for ignition (23), it used also to create a working torch at the setup outlet.

Heating of components and mixture (35) in normal mode is carried out by means of technological cylinder, having several sections, according to the stages number for implementing of the method.

Components—water and hydrocarbon component are loaded into sealed containers (1, 2) under the constant pressure of 0.3-0.5 MPa to ensure their uninterrupted supply to the system by pumping through control valves (25) (FIG. 1a, FIG. 2). Loading can be carried out periodically, as fast, as component discharge, or continuously.

Because the basis is taken in a three-stage process, in the first stage in the normal mode of self-heating, water is heated up to superheated steam with temperature of 500-550° C., and in the start-up mode with forced heating—up to temperature of 450-500° C.

The resulting superheated steam is directed to the mixing with the hydrocarbon components. Mixing is provided by injection (8) of steam (FIG. 5).

Then the steam and hydrocarbon mixture is additionally heated in the second section of the technological cylinder (11) and in the third section (12) mixture is heated up to a temperature of formation of gaseous fuel, which in the normal mode of self-heating is directed to return (23) for igniting and flame torch formation.

In the start-up mode with forced heating (7) the steam and hydrocarbon mixture is directed (22) for ignition from the second section (11).

The efficiency of the method consists in increasing the stability of process of hydrogen-containing gaseous fuel and producing (with a significant reduction of failures number), a reduction of power consumption and hydrocarbon component discharge (increasing the value of indicator of water/diesel fuel ratio).

The table below shows the comparative characteristics of the known technical solutions and proposed method. These characteristics confirm the efficiency of proposed method and its possibility to solve the claimed technical problem.

TABLE

Example of a concrete implementation of the method and the technical characteristics thermal gas generator setups, realizing the Arakelyan GG method

| Technical characteristic | Unit of measurement | Setup "Grantstroy" type VTPGU-1 series of 2009 (implementation of the prototype) | Setup "Grantstroy" type VTTGU-700 series of 2011 (implementation of the claimed solution) |
|---|---|---|---|
| discharge of Water H2O | liters per hour | 20-25 | 20-25 |
| Diesel fuel discharge in normal mode | liters per hour | 3.0-3.1 | 2.4-2.5 |
| Water/diesel fuel ratio | | (6.5:1)-(8.0:1) Average (7.25:1) (87.9:12.1)% | (8.0:1)-(10.4:1) Average (9.5:1) (90.5:9.5)% |
| Setup outer diameter | mm | 203 | 203 |
| Thermal power | Gcal | 1.0 | 1.0 |
| Average frequency of the flame failure on an operating time of 1,000 hours | Flame failure per hour | 0.1 | 0.01 |

Implementation of the Method

The method is implemented using the plant, including appropriate elements that are made as a single device, which has a complex multi section corpus, a burner system (30), the firing chamber (9), injection type unit for mixing the components (8), the pulse ignition unit (5), pipes and start-up system, including start-up burner (4) with a supply of combustible fuel (a, b, or c).

The corpus is made single as two cylindrical tubes, imbedded in one another (33, 34), with a gap, forming technological cylinder.

Technological cylinder is heated by the firing torch, it is divided on hermetically isolated sections (10, 11, and 12)—the section number corresponds to the stages number of the fuel mixture making process.

The first section (10) corresponds to vaporization stage. This section is equipped with an independent induction source of heat (7) for realizing the start-up process.

The second plant part, corresponding to stage of components mixing and heating of a water steam and gas mixture, includes a section 11 of technological cylinder, injection type mixer (8).

The third section (12) serves for final warming-up of mixture and producing of fuel.

Inner tube cavity (9) with an inner diameter r1 forms the firing chamber of firing torch formation (13, 14) for the technological cylinder heating.

Unit for mixing (8), of the second stage, is made as an injector with a separate entries (19) for water, in the steam form, and hydrocarbon component (18).

The plant is equipped with fuel tanks, which is are made as separate, sealed, discharge containers for water (1) and the hydrocarbon component (2).

Discharge water container (1) is connected via pipe (17) to the inlet of the first section of the technological cylinder of vaporization chamber (10), the outlet of vaporization chamber is connected via pipe to the injector first inlet, the second inlet of which is connected to the hydrocarbon component discharge container, the injector outlet is connected via pipe to a section (11) for heating a steam and gas mixture, section (11) for heating a steam and gas mixture is connected via pipe (21) with a additional heating chamber (12) to form a fuel mixture, outlet this chamber is connected via pipe (23) to the inlet of the firing chamber (9), where the turbine burner system is installed, this system has ignition device with spark-ignition pulse source (5), working burner (3) start-up burner (4), on the firing chamber outlet is installed the working torch formation element (16), as a constrict unit, (15).

Ratio of radii of tubes, forming the technological cylinder for fuel mixture producing is:

$$0.3 < (R1/r2) > 0.1;$$

Where:
R1—is the outer diameter of the inner tube,
r2—is the inner diameter of outer tube, At the turbine burner system inlet is installed turbocharger unit (6), and into the discharge containers (1.2) is maintained constant overpressure of 0.3-0.5 MPa.

The graph of FIG. 6 shows dependence of the temperature in the technological cylinder on its sections.

The invention claimed is:

1. A method of producing a gaseous fuel, the method comprising steps of:
   providing a cylinder divided into a plurality of isolated chambers and external and internal heat sources configured to heat the cylinder;
   in a startup mode
      introducing water into a first of the plurality of isolated chambers;
      igniting the external heat source;
      heating the first isolated chamber with the external heat source to form water steam;
      introducing a pressurized hydrocarbon component into a second of the plurality of isolated chambers;
      adding the water steam into the second isolated chamber;
      mixing in the second chamber the introduced hydrocarbon component with the added water steam to form a mixture,
      directing a part of the mixture into an ignition zone of the internal heat source;
      igniting the internal heat source and exterminating the external heat source;
   in a normal mode
      maintaining burning of the internal heat source;
      heating, using the internal heat source, the mixture in the second isolated chamber to a predetermined temperature for forming gaseous fuel including hydrogen;
      directing a part of the gaseous fuel into the ignition zone of the internal heat source for maintaining the internal heat source burning; and
      storing the gaseous fuel and providing the gaseous fuel for external consumption;
   wherein the plurality of isolated chambers are positioned annularly about the internal heat source; and
   wherein the plurality of isolated chambers are in fluid communication via pathways external to the cylinder.

2. The method according to claim 1 wherein the normal mode is carried out with heating in three steps, in a first step introducing water by pumping under a pressure of 0.3-0.5 MPa and heating the water steam formation with a temperature of 500-550° C., in a second step introducing the hydrocarbon component into a mixer by pumping under pressure of 0.3-0.5 MPa, mixing this hydrocarbon component with water steam in the mixer by injection under pressure of 0.06-0.25 MPa, at a ratio of water to hydrocarbon component from 10.5:1 to 8:1, and heating the mixture up to a temperature of 1000-1100° C., at a third step heating the mixture up to a temperature of 1300-2000° C.

3. The method according to claim 1, wherein the normal mode of self-heating ignition is carried out by an ignition pulse unit with an external source—sparking generator, running with a frequency of 1-2 Hz.

4. The method according to claim 1, wherein the process of formation and maintenance of the fire torch is carried out with a turbo charging.

5. The method according to claim 1, wherein start-up mode introducing water by pumping in an amount of 40-50% of maximum amount of a normal working volume under pressure 0.3-0.5 MPa, heating is carried out until formation of water steam at a temperature 450-500° C. heating is carried out by the external source of heat.

6. The method according to claim 1, wherein at start-up mode the external source comprising an ignition spark pulse device with
   an independent sparking source, which operate with a frequency of 40-50 Hz.

7. The method according to claim 1, wherein the independent source of heat is an induction heater.

8. A method of producing a gaseous fuel, the method comprising steps of:
   providing a cylinder having at least two chambers and external and internal heat sources configured to heat the cylinder;
   in a first stage
      introducing water into a first chamber of the cylinder;
      using the external heat source, heating the first chamber of the cylinder to form water steam;
      mixing a pressurized hydrocarbon component with the water steam to form a mixture in a second chamber of the cylinder;
      replacing the external heat source with the internal heat source by directing a part of the mixture into an ignition zone of the internal heat source and firing and maintaining burning of the internal heat source; and
   in a second stage
      using the internal heat source, heating the second chamber of the cylinder including the mixture to a predetermined temperature for forming gaseous fuel including hydrogen,
      storing said gaseous fuel and providing said gaseous fuel for external consumption;
   wherein the plurality of isolated chambers are positioned annularly about the internal heat source; and
   wherein the plurality of isolated chambers are in fluid communication only via pathways external to the cylinder.

9. The method according to claim 8, wherein in the first stage introducing water by pumping under a pressure of 0.3-0.5 MPa and in an amount of 40-50% of maximum amount of the second stage volume and heating the water steam in the first stage formation with a temperature of 450-550° C. by the external source of heat, mixing this hydrocarbon component with water steam in the second stage in a mixer by injection under pressure of 0.06-0.25 MPa, at a ratio of water to hydrocarbon component from 10.5:1 to 8:1, wherein the predetermined temperature is 1300-2000° C.

10. The method according to claim 8, wherein the first stage of self-heating ignition is carried out by an ignition pulse unit with an external source a sparking generator, running with a frequency of 1-2 Hz.

11. The method according to claim 8, wherein the external source comprising an ignition spark pulse device with an independent sparking source, which
operate with a frequency of 40-50 Hz.

* * * * *